US012011842B2

(12) United States Patent
Washington

(10) Patent No.: US 12,011,842 B2
(45) Date of Patent: Jun. 18, 2024

(54) SHAVING RAZOR SYSTEM

(71) Applicant: The Gillette Company LLC, Boston, MA (US)

(72) Inventor: Jack Anthony Washington, Mendon, MA (US)

(73) Assignee: The Gillette Company LLC, Boston, MA (US)

(*) Notice: Subject to any disclaimer, the term of this patent is extended or adjusted under 35 U.S.C. 154(b) by 0 days.

(21) Appl. No.: 18/295,444

(22) Filed: Apr. 4, 2023

(65) Prior Publication Data

US 2023/0241791 A1 Aug. 3, 2023

Related U.S. Application Data

(62) Division of application No. 16/906,625, filed on Jun. 19, 2020, now Pat. No. 11,648,694.

(51) Int. Cl.

| | |
|---|---|
| ***B26B 21/16*** | (2006.01) |
| ***B26B 21/40*** | (2006.01) |
| ***B26B 21/52*** | (2006.01) |

(52) U.S. Cl.

CPC ........ *B26B 21/165* (2013.01); *B26B 21/4018* (2013.01); *B26B 21/521* (2013.01)

(58) Field of Classification Search

USPC ................................................ 30/47–55, 526

See application file for complete search history.

(56) References Cited

U.S. PATENT DOCUMENTS

| | | | |
|---|---|---|---|
| 589,513 | A | 9/1897 | Strong |
| 770,767 | A | 9/1904 | Mihills |
| 843,148 | A | 2/1907 | Jackson |
| 913,005 | A | 2/1909 | Lancellotte |
| 915,989 | A | 3/1909 | Moore |
| 923,077 | A | 5/1909 | Reichard |
| 934,074 | A | 9/1909 | Johnson |
| 968,428 | A | 8/1910 | Smith |
| 1,024,348 | A | 4/1912 | Lorenzen |
| 1,033,373 | A | 7/1912 | Barrett et al. |
| 1,044,476 | A | 11/1912 | Bean |
| 1,104,857 | A | 7/1914 | Windham |
| 1,239,644 | A | 9/1917 | Tuttle |
| 1,280,972 | A | 10/1918 | Dignam |
| 1,319,343 | A | 10/1919 | Jones |
| 1,326,635 | A | 12/1919 | Besancon |

(Continued)

FOREIGN PATENT DOCUMENTS

| | | |
|---|---|---|
| GB | 160526 A | 3/1921 |
| GB | 454245 A | 9/1936 |

*Primary Examiner* — Jason Daniel Prone

(74) *Attorney, Agent, or Firm* — John M. Lipchitz

(57) ABSTRACT

A shaving razor system having a handle having a first end with a top surface defining recessed surface between a pair of guide surfaces. A shaving razor cartridge is removably mounted to the first end of the handle. The shaving razor cartridge includes a housing and a blade carrier assembly. The blade carrier assembly has a blade carrier with a blade platform at a first end, a tab extending from the blade platform to a second end. The tab has a crest positioned within the recessed surface of the handle. A blade is mounted to the blade platform. The blade has a cutting edge. The tab is positioned between a pair of guide members on the housing that engage the corresponding guide surfaces of the handle.

5 Claims, 8 Drawing Sheets

(56) References Cited

U.S. PATENT DOCUMENTS 1,327,498 A 1/1920 Sutton
1,337,435 A 4/1920 Brown
1,370,935 A 3/1921 Gorder et al.
1,475,940 A 12/1923 William et al.
1,480,028 A 1/1924 Noel
1,488,093 A 3/1924 Carpenter
1,489,102 A 4/1924 Adams
1,490,458 A 4/1924 Fairweather et al.
1,494,997 A 5/1924 Michael
1,498,890 A 6/1924 Steedman
1,643,757 A 9/1927 Wallenbeck
1,697,355 A 1/1929 Alexander
1,707,493 A 4/1929 John
1,759,981 A 5/1930 Elzinga et al.
1,799,965 A 4/1931 Fairweather et al.
1,849,299 A 3/1932 Jansson et al.
1,876,570 A 9/1932 Cesario
1,988,815 A 1/1935 John
2,010,304 A 8/1935 Elmer
2,241,986 A 5/1941 Driess et al.
2,261,673 A 11/1941 Barrows
2,262,248 A 11/1941 Oconnor
2,288,299 A 6/1942 Pileggi
2,296,461 A 9/1942 Berg
2,320,154 A 5/1943 Nunnally
2,466,296 A 4/1949 Ashley
2,530,216 A 11/1950 Gustave
2,534,490 A 12/1950 Weeks
2,536,485 A 1/1951 Siegfried
2,593,574 A 4/1952 La
2,665,477 A 1/1954 Randol
2,677,176 A 5/1954 Randol
2,682,105 A 6/1954 Randol
2,713,200 A 7/1955 Alwood, Jr.
2,720,697 A 10/1955 Duncan
2,893,119 A 7/1959 Joseph
3,054,180 A 9/1962 Gore
3,106,020 A 10/1963 Tape
3,111,756 A 11/1963 Kruger et al.
3,263,330 A 8/1966 Ferrara
3,292,643 A 12/1966 Pryde
3,350,779 A 11/1967 Michael
3,409,982 A 11/1968 Barnes et al.
3,583,262 A 6/1971 Mullen
3,599,327 A 8/1971 Calandra
4,037,322 A 7/1977 Bresler
4,058,891 A 11/1977 Spanel
D254,692 S 4/1980 Del
4,213,240 A 7/1980 Ferraro et al.
4,257,160 A 3/1981 Murai
4,344,226 A 8/1982 Blake, III
4,441,252 A 4/1984 Caves
4,453,310 A 6/1984 Miserez
D287,059 S 12/1986 Gille
RE32,367 E 3/1987 Bowman et al.
4,813,131 A 3/1989 Gruner
5,220,728 A 6/1993 Ueno et al.
5,251,376 A 10/1993 Althaus et al.
5,253,420 A 10/1993 Althaus et al.
5,461,781 A 10/1995 Pirc
5,517,760 A 5/1996 Prochaska
5,715,606 A 2/1998 De et al.
D415,317 S 10/1999 Aiston
6,094,820 A 8/2000 Adachi
6,237,444 B1 5/2001 Kim
6,473,971 B2 11/2002 Ordaz
6,655,029 B2 12/2003 Saito
D495,827 S 9/2004 Branden
D496,129 S 9/2004 Ogi
D499,210 S 11/2004 Shepperson et al.
D499,511 S 12/2004 Wakayama
7,171,752 B2 2/2007 Lee
8,191,557 B2 6/2012 Saiki
8,739,411 B2 6/2014 Kinghorn et al.
8,806,760 B2 8/2014 Moons
8,839,521 B2 9/2014 Hazard
9,616,584 B2 4/2017 Coresh
9,718,200 B2 8/2017 Dryfhout
D822,279 S 7/2018 Newman
D823,541 S 7/2018 Wertz
D827,932 S 9/2018 Alphonso et al.
10,137,583 B1 11/2018 Toone et al.
10,406,704 B2 9/2019 Barrett et al.
10,449,683 B2 10/2019 Spencer et al.
D870,379 S 12/2019 Lambert
D889,040 S 6/2020 Stowers
10,786,917 B1 9/2020 Walton
D898,284 S 10/2020 Ng et al.
D905,339 S 12/2020 Roche
D905,344 S 12/2020 Wang
11,389,981 B2 * 7/2022 Washington ............ B26B 21/16
D961,848 S 8/2022 Washington
D967,528 S 10/2022 Goeder et al.
D977,718 S 2/2023 Goeder et al.
11,648,694 B2 * 5/2023 Washington .......... B26B 21/165 30/51
11,648,695 B2 * 5/2023 Washington .......... B26B 21/165 30/51
11,691,305 B2 * 7/2023 Washington .......... B26B 21/165 30/51
D1,004,198 S 11/2023 Goeder et al.
2002/0092175 A1 7/2002 Kameka
2009/0007442 A1 1/2009 Kurihara
2009/0235529 A1 9/2009 Ringart et al.
2010/0043612 A1 2/2010 Ichiyanagi et al.
2015/0360375 A1 12/2015 Wertz
2017/0113363 A1 4/2017 Lopez
2019/0358836 A1 11/2019 Maimone et al.
2021/0394378 A1 12/2021 Washington
2023/0241791 A1 8/2023 Washington

* cited by examiner

SHAVING RAZOR SYSTEM

This application is a Divisional of U.S. application Ser. No. 16/906,625 filed on Jun. 19, 2020, now U.S. Pat. No. 11,648,694.

FIELD OF THE INVENTION

The present invention relates to shaving razors and more particularly to shaving razor systems that have a blade carrier and a shaving razor cartridge releasably mounted to a handle.

BACKGROUND OF THE INVENTION

In general, a cartridge or blade unit of a safety razor has at least one blade with a cutting edge which is moved across the surface of the skin being shaved by means of a handle to which the cartridge is attached. Some shaving razors are provided with a spring biased cartridge that pivots relative to the handle to follow the contours of the skin during shaving. The cartridge can be mounted detachably on the handle to enable the cartridge to be replaced by a fresh cartridge when the blade sharpness has diminished to an unsatisfactory level, or it can be attached permanently to the handle with the intention that the entire razor be discarded when the blade or blades have become dulled. Razor cartridges usually include a guard which contacts the skin in front of the blade(s) and a cap for contacting the skin behind the blade(s) during shaving. The cap and guard can aid in establishing the so-called "shaving geometry,", i.e., the parameters which determine the blade orientation and position relative to the skin during shaving, which in turn have a strong influence on the shaving performance and efficacy of the razor. The cap can comprise a water leachable shaving aid to reduce drag and improve comfort. The guard can be generally rigid, for example formed integrally with a frame or platform structure which provides a support for the blades. Guards can also comprise softer elastomeric materials to improve skin stretching.

Shaving systems often consist of a handle and a replaceable cartridge in which one or more blades are mounted in a plastic housing. After the blades in a cartridge have become dull from use, the cartridge is discarded, and replaced on the handle with a new cartridge. These types of shaving systems that utilize a variety of connection schemes to affix the cartridge to the handle have become popular. The connection scheme allows the consumer to easily, repeatedly, efficiently and intuitively load and remove the new and used cartridges from the handle and provides the necessary retention forces to maintain the integrity of the handle-to-cartridge attachment during shaving.

The connection scheme must be robust enough to provide the necessary retention forces to maintain the integrity of the handle-to-cartridge attachment during shaving. The attachment of a razor cartridge to razor handle can provide sufficient retaining force to secure the razor cartridge to the razor handle over a wide variety of shaving conditions. Some shavers use very high forces when shaving and some razors have a hair trimming system mounted on the side or back of the razor cartridge. In contrast, razors that use razor cartridges that are releasably connected can provide low attachment and release forces to facilitate easy changing of cartridges by a shaver.

There is a growing market for more premium handles, which are typically made from various metals, making the handles much heavier. The heavier handles provide a more pleasing feel in the consumers hand during shaving. Some consumers believe that heavier handles provide improved control during shaving. However, an increase in the handle weight increases the likelihood the attachment mechanism breaks if the handle is dropped. Accordingly, there is a need for a simpler, more robust, more intuitive and reliable shaving handle-to-cartridge connection.

SUMMARY OF THE INVENTION

In one aspect, the invention features, in general a blade carrier assembly with a blade carrier having a blade platform at a first end. A tab extends from the blade platform to a second end. A blade is mounted to the blade platform. The blade has a cutting edge. The tab has a crest configured to engage a handle. The crest is positioned between a pair of angled surfaces of the tab.

In another aspect, the invention features, in general a blade carrier having a blade platform at a first end. The blade platform defines at least one window. A tab extends from the blade platform to a second end. The tab has a crest configured to engage a handle. The crest is positioned between a pair of angled surfaces of the tab. The blade platform defines a slot dimensioned to receive a blade.

In another aspect, the invention features, in general a shaving razor system with a handle having a first end with a top surface defining a recessed surface between a pair of guide surfaces. A shaving razor cartridge is removably mounted to the first end of the handle. The shaving razor cartridge includes a housing and a blade carrier assembly. The blade carrier assembly has a blade carrier with a blade platform at a first end. A tab extends from the blade platform to a second end. The tab has a crest between a pair of angled surfaces of the tab. A blade is mounted to the blade platform. The blade has a cutting edge. The tab flexes between a first position and a second position to secure and detach the shaving razor cartridge from the handle.

In another aspect, the invention features, in general a shaving razor system with a handle having a first end with a top surface defining recessed surface between a pair of guide surfaces. A shaving razor cartridge may be removably mounted to the first end of the handle. The shaving razor cartridge includes a housing and a blade carrier assembly. The blade carrier assembly has a blade carrier with a blade platform at a first end. A tab extends from the blade platform to a second end. The tab has a crest positioned within the recessed surface of the handle. A blade is mounted to the blade platform. The blade has a cutting edge. The tab is positioned between a pair of guide members on the housing that engage the corresponding guide surfaces of the handle.

In another aspect, the invention features, in general a shaving razor handle with a first end, a second end and a gripping portion between the first end and the second end. The first end has a top surface defining a recessed surface with a lowermost portion, an inclined surface and a generally flat landing. The top surface of the handle has a pair of "L" shaped arms. The recessed surface is positioned between the pair of "L" shaped arms.

In another aspect, the invention features, in general a shaving razor cartridge with a housing having a bottom surface with a pair of guide members. The shaving razor cartridge includes a blade carrier having a first end with a blade platform with a tab extending from the blade platform to a second end. A blade is mounted to the blade platform. The blade platform is mounted to the bottom surface with the tab being unsupported and positioned between the pair of guides members.

In another aspect, the invention features, in general a method of manufacturing a shaving razor cartridge by providing a housing having a bottom surface with a pair of guide members. A blade platform of a blade carrier is mounted to the bottom surface of the housing. A blade is mounted to the blade platform. A tab that extends from the blade platform to a second end is unsupportably positioned between the pair of guide members.

In another aspect, the invention features, in general a method of manufacturing a blade carrier assembly by providing a sheet of metal having a thickness of 0.1 mm to 1 mm. The sheet of metal is cut to form a blade carrier blank having a blade platform and a tab extending from the blade platform. The tab is coined to form a crest. At least one window is cut into the sheet of metal. The blade carrier blank is bent along the at least one window to form an upper portion and a lower portion. A blade is mounted to the lower portion. The blade is clamped by bending the upper portion toward the lower portion until the blade is in contact with both the upper portion and the lower portion.

In another aspect, the invention features, in general a method of manufacturing a blade carrier by providing a sheet of metal having a thickness of about 0.1 mm to 1 mm. The sheet of metal is cut to form a blade carrier blank having a blade platform and a tab extending from the blade platform. A crest is formed in the tab. A notch is cut into the blade carrier blank on either side of the tab. The blade carrier blank is bent along the at least one window to form an upper portion and a lower portion. A pair of alignment members are cut into the blade carrier blank. The blade is clamped by bending the upper portion toward the lower portion until the blade is in contact with both the upper portion and the lower portion.

BRIEF DESCRIPTION OF THE DRAWINGS

Other features and advantages of the present invention, as well as the invention itself, can be more fully understood from the following description of the various embodiments, when read together with the accompanying drawings, in which.

DETAILED DESCRIPTION OF THE INVENTION

Figure 1A:
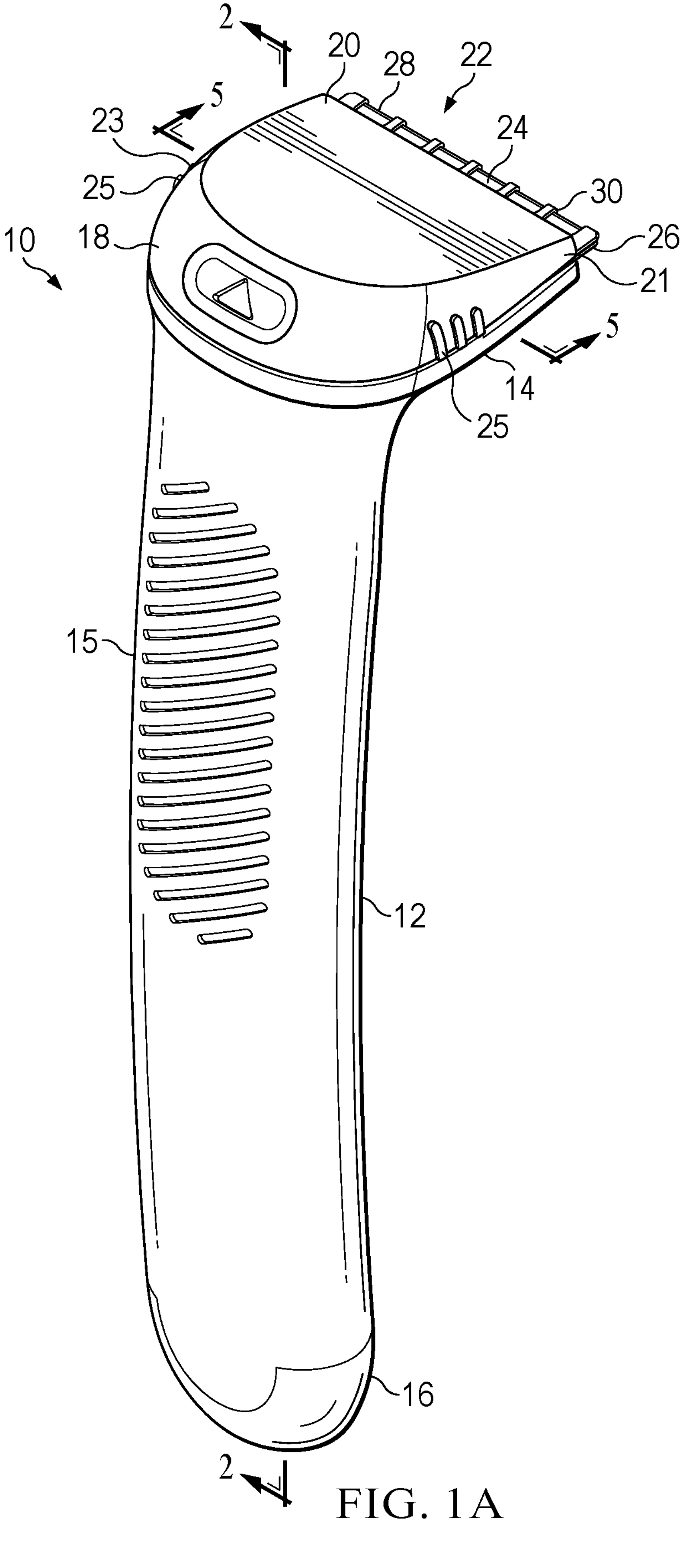
FIG. 1A is a top perspective view of a shaving razor system according to one possible embodiment of the present invention.

Referring to FIG. 1A, a perspective view of a shaving razor system 10 is illustrated. The shaving razor system 10 may include a handle 12 having a first end 14, a second end 16 and a gripping portion 15 between the first end 14 and the second end 16. A shaving razor cartridge 18 may be removably mounted to the first end 14. The shaving razor cartridge 18 may include a housing 20 and a blade carrier assembly 22. The housing 20 may be manufactured (e.g., molded) from a polymeric material. The blade carrier assembly 22 may include one or more blades 24 mounted to a blade carrier 26. The blade 24 may have an exposed cutting edge 28. In certain embodiments, the blade carrier 26 may have a plurality of spaced apart guards 30 to protect the skin from the cutting edge 28 during a shaving stroke. As will be explained in greater detail below, the blade carrier 26 may retain the blade 24, as well as facilitate the temporary securement of the shaving razor cartridge 18 to the handle 12.

Figure 1B:
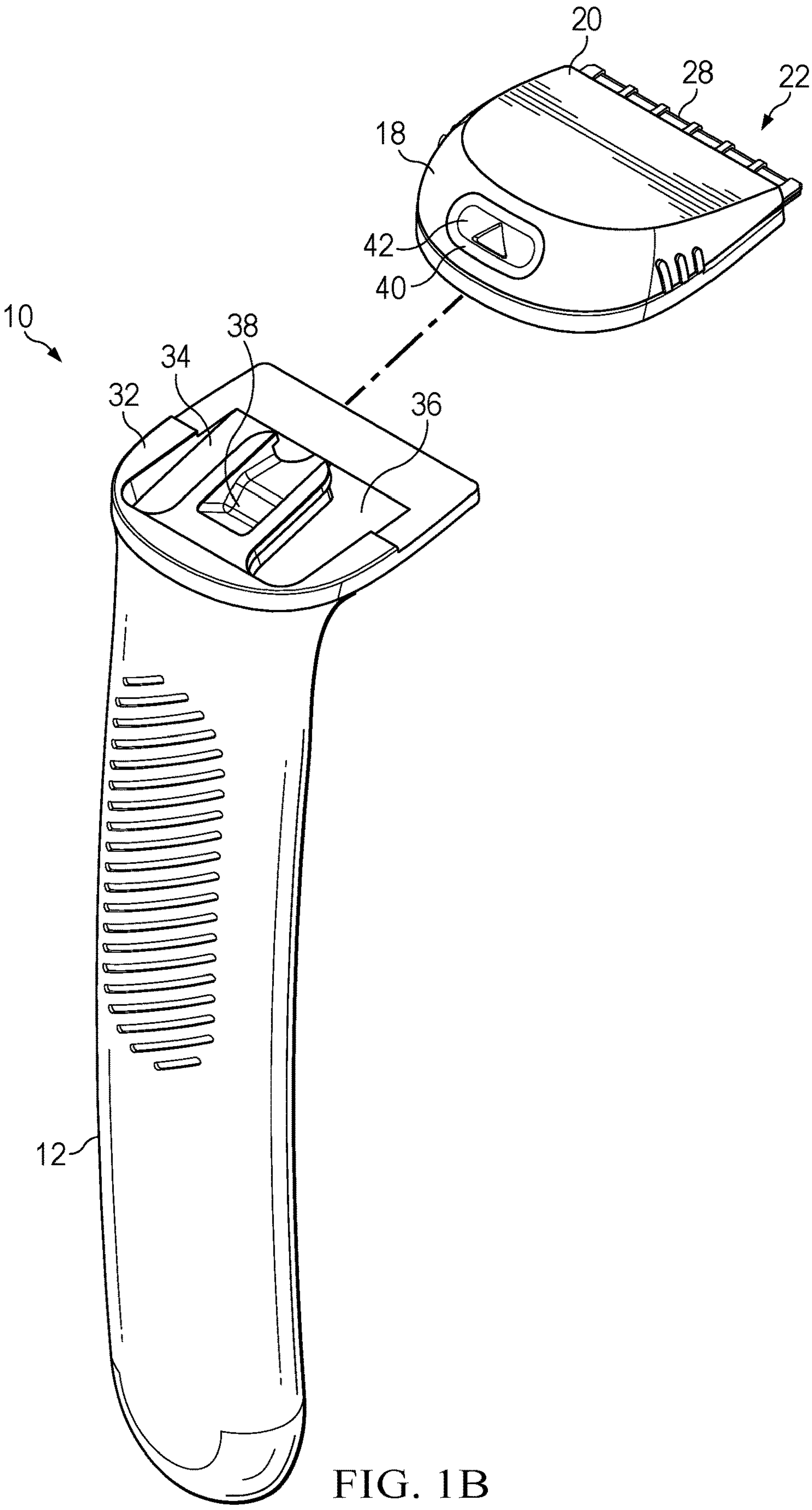
FIG. 1B is an assembly view of a handle and a shaving razor cartridge of the shaving razor system of FIG. 1A in an upright position.

The shaving razor cartridge 18 may have a first position with the shaving razor cartridge 18 mounted detachably on the handle 12 (as shown in FIG. 1A) to enable the shaving razor cartridge 18 to be replaced by a fresh shaving razor cartridge 18 when the sharpness of the blade 24 has diminished to an unsatisfactory level. Referring to FIG. 1B, a perspective view of a shaving razor system 10 is illustrated with the shaving razor cartridge 18 removed from the handle 12. The first end 14 of the handle 12 may have a top surface 32. As will be explained in greater detail below, the top surface 32 may define a pair of guide surfaces 34 and 36 (e.g., slots) dimensioned to receive corresponding surfaces on the housing 20. The top surface 32 of the handle 12 may also define a recessed surface 38 between the pair of guide surfaces 34 and 36. The housing 20 may have a rear surface 40 opposite the cutting edge 28. The rear surface 40 may include an indicia 42, such as a sign or symbol to indicate to the consumer where and in what direction to push the shaving razor cartridge 18 to remove the shaving razor cartridge 18 from the handle 12. In certain embodiments, the housing 20 may have a pair of opposing lateral side surface 21 and 23 each having one or more protrusions 25 to improve a user's grip on the shaving razor cartridge 18 during attachment and removal of the shaving razor cartridge 18 to the handle 12.

Figure 2:
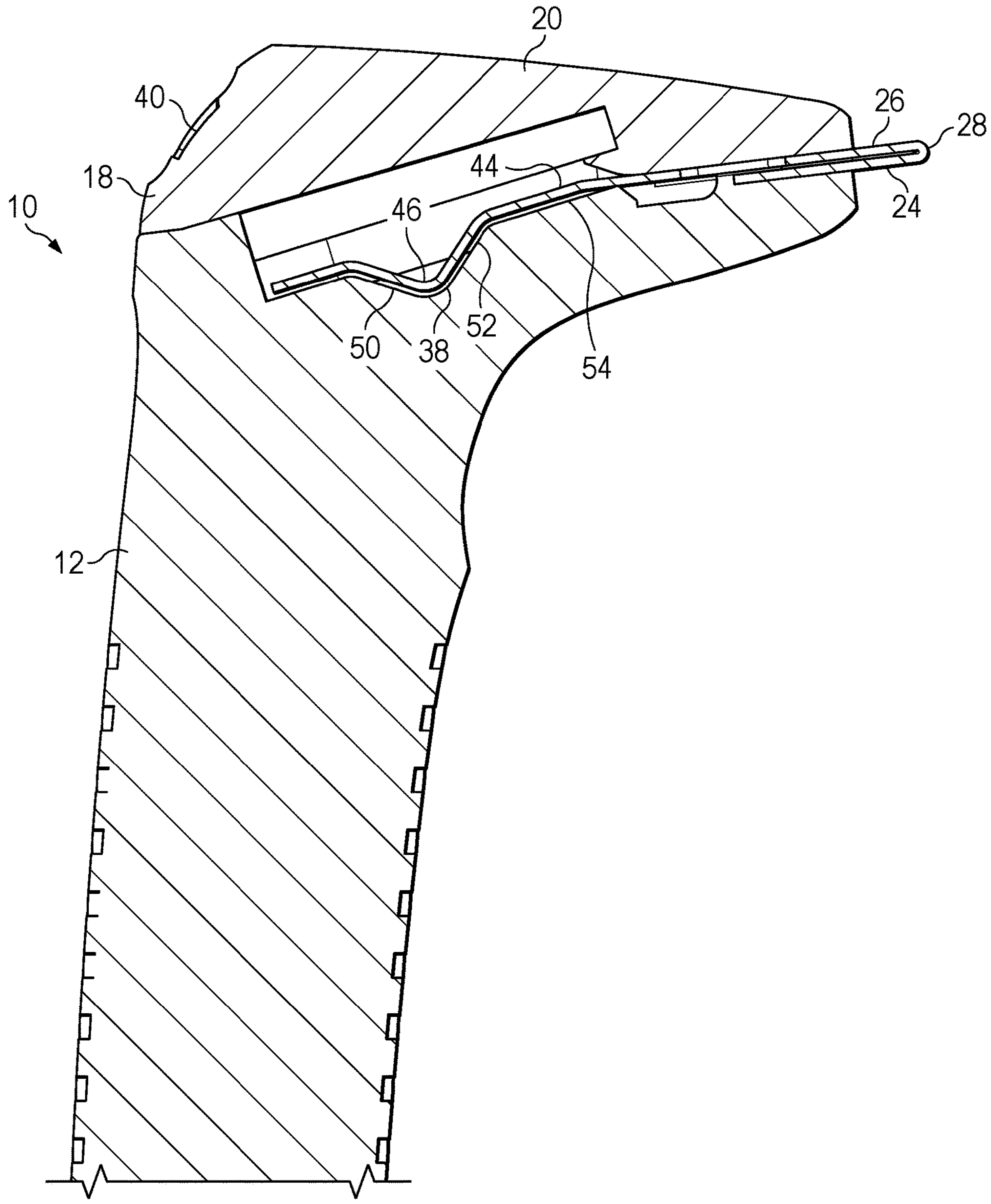
FIG. 2 is a cross sectional view of the shaving razor system, taken generally along the line 2-2 of FIG. 1A.

Referring to FIG. 2, a cross sectional view of the shaving razor system 10, taken generally along the line 2-2 of FIG. 1A is shown. The blade carrier 26 may have a tab 44 in a first position with a crest 46 of the tab 44 positioned within the recessed surface 38 of the handle 12. The crest 46 may secure the shaving razor cartridge 18 to the handle 12. A user may remove the shaving razor cartridge 18 by pushing against the rear surface 40 of the housing 20 in a direction towards the cutting edge 28. The crest 46 may slide out of a lowermost portion 50 of the recessed surface 38 and along an inclined surface 52 to a generally flat landing 54 of the handle 12. The tab 44 may deflect away from the handle 12 and toward the housing 20 to facilitate the crest 46 to slide out of the recessed surface 38. As the housing 20 is pushed forward the housing 20 may disengage the guide surfaces 34 and 36 (FIG. 1B). Once the crest 46 engages the landing 54, little or no force may be required to remove the shaving razor cartridge 18 from the handle 12.

Figure 3:
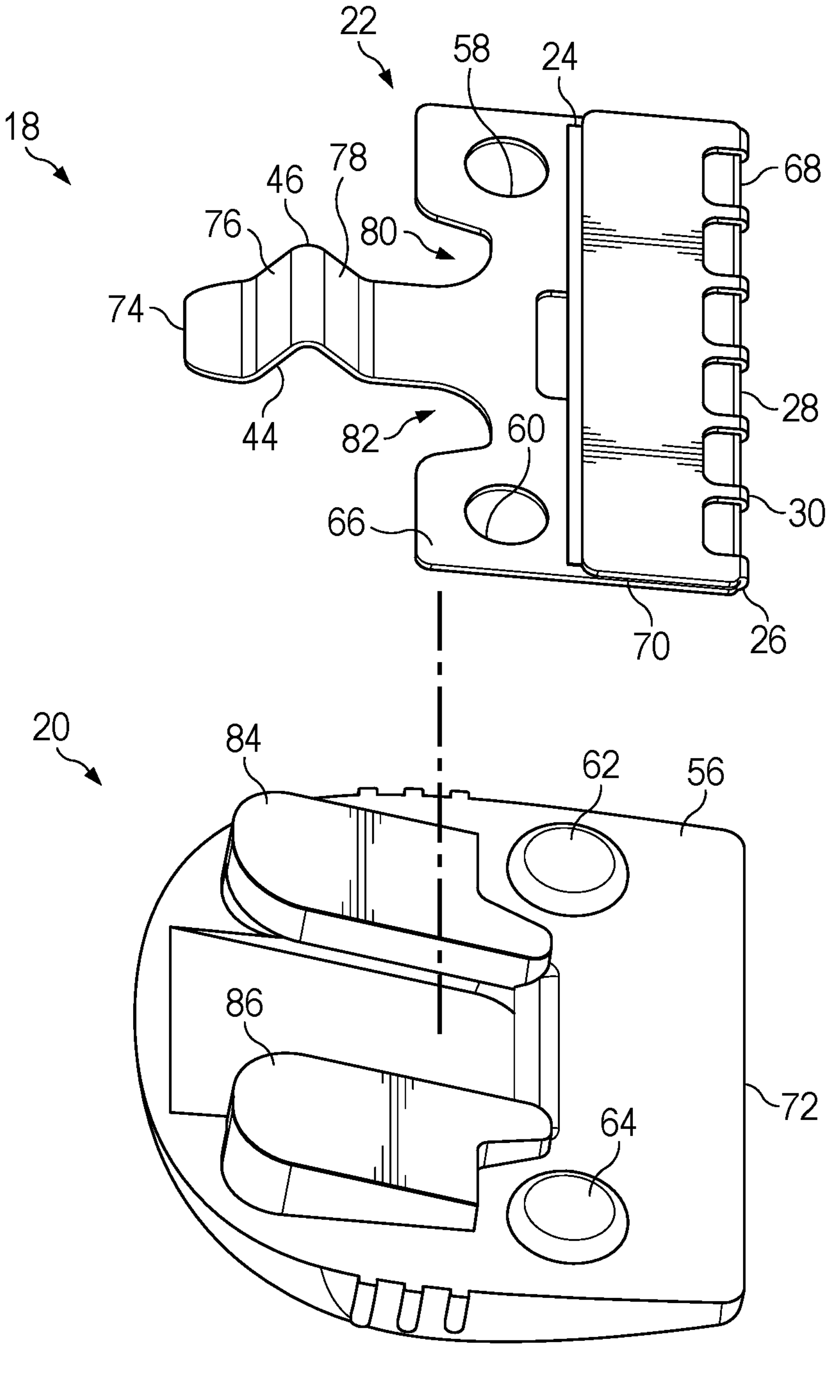
FIG. 3 is bottom perspective view of a housing and a blade carrier assembly of the shaving razor cartridge of FIG. 1B.

Referring to FIG. 3, a bottom perspective view of the housing 20 and blade carrier 26 of the shaving razor cartridge 18 is illustrated. The shaving razor cartridge 18 may include the blade carrier assembly 22 mounted to the housing 20. For example, the blade carrier 26 may be mounted to a bottom surface 56 of the housing 20. The bottom surface 56 of the housing 20 may have one or more alignment members 62 and 64, such as protrusions, that engage a corresponding pair of alignment members 58 and 60 on the blade carrier assembly 22 (e.g., openings extending through the blade carrier assembly 22). In certain embodiments, the blade carrier assembly 22 (e.g., the blade carrier 26) may be fixed to the housing 20 by staking, adhesives, ultrasonic welding, insert injection molding, or other assembly methods known in the art. The tab 44 may be positioned between a pair of guide members 84 and 86 of the bottom surface 56 of the housing 20. The position of the tab 44 between the pair of guide members 84 and 86 may help protect the tab 44 from being damaged or excessively bent.

The blade carrier 26 may have a blade platform 66 at a first end 68 that defines a slot 70 configured to receive the blade 24. The slot 70 may be positioned on the same side of the blade carrier 26 as the crest 46 to simply the manufacturing process (e.g., forming and bending of the crest 46 and slot 70. The cutting edge 28 of the blade 24 may be positioned against the spaced apart guards 30. Accordingly, the slot 70 may be closed on one side (i.e., side with the spaced apart guards 30) and open on three sides for easy loading of the blade 24. The blade 24 may be fixed to the blade platform 66 (e.g., using adhesive) or may be removably positioned within the slot 70. The cutting edge 28 and the plurality of guards may extend over a front edge 72 of the housing 20 to provide sufficient cutting and trimming of hair. The tab 44 may extend from the blade platform 66 to a second end 74. The crest 46 may be positioned between a pair angled surfaces 76 and 78. For example, a leading angled surface 76 and a trailing angled surface 78. The blade platform 66 may define a pair of notches 80 and 82 on either side of the tab 44. The notches 80 and 82 may provide the tab 44 with sufficient spring properties to facilitate optimal attachment and detachment to the handle 12 (not shown) over numerous cycles. The blade platform 66 may be fixed to the housing 20 to allow the tab 44 to flex relative to the blade platform and the housing 20 as the shaving razor cartridge 18 is attached to the handle (see FIGS. 1A and 1B).

Figure 4:
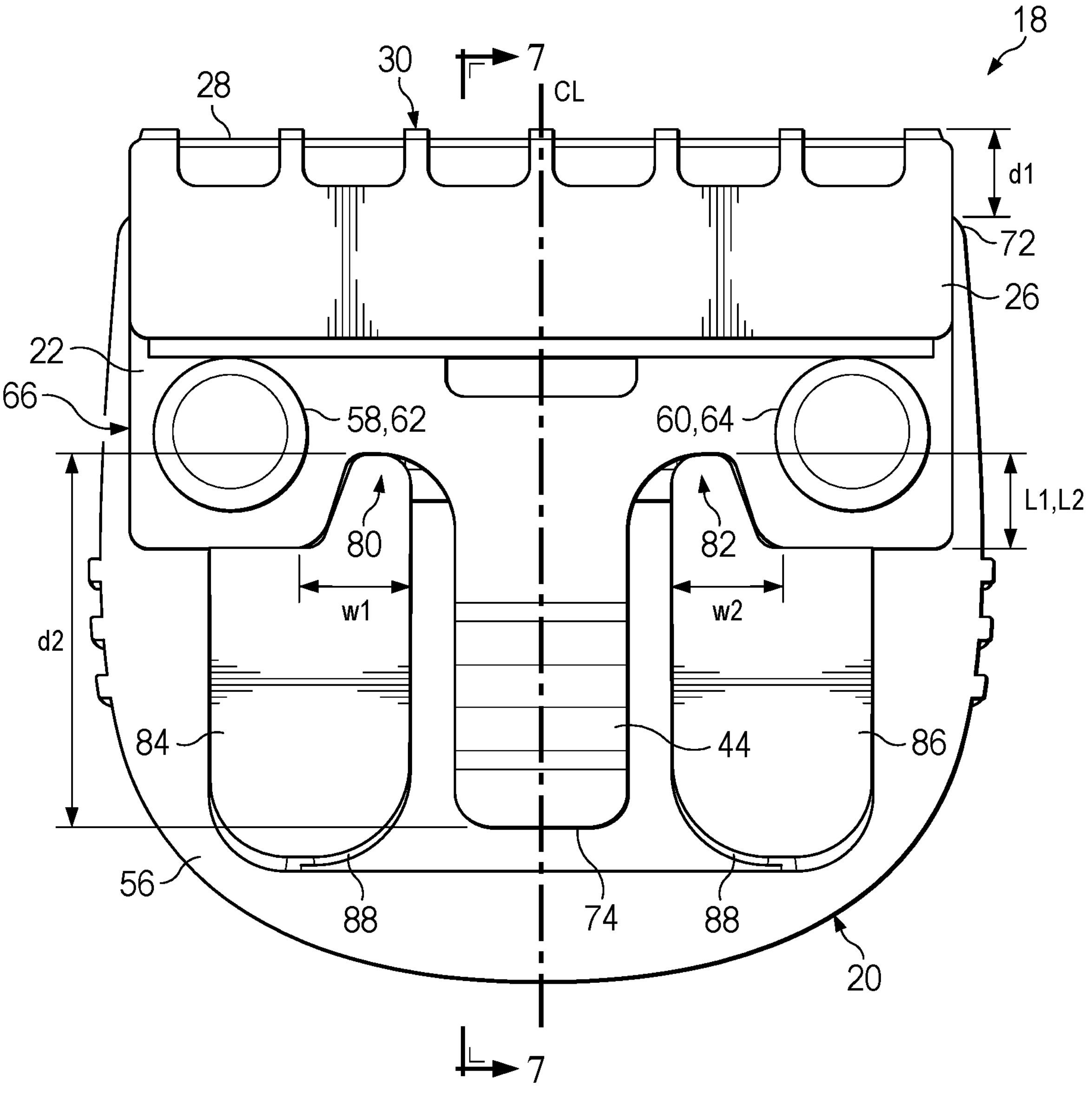
FIG. 4 is a bottom view of the shaving razor cartridge.

Referring to FIG. 4, a bottom view of the shaving razor cartridge 18 is illustrated with the blade carrier assembly 22 mounted to the housing 20. The alignment members 58, 60, 62 and 64 may be used to stabilize the blade carrier 26 as it is mounted and/or secured to the housing 20. In certain embodiments, the alignment members 58, 60, 62 and 64 may also be used to fix the blade carrier 26 to the housing 20 (e.g., cold staking process). The alignment members 58 and 62 may be positioned on one side of the centerline "CL" and alignment members 60 and 64 may be positioned on the other side of the centerline "CL". In certain embodiments, the blade carrier assembly 22 may be removable from the housing 20. Accordingly, the alignment members 58, 60, 62 and 64 may facilitate temporary securement of the blade carrier assembly 22 to the housing 20. For example, the alignment members 58, 60, 62 and 64 may provide a slight press fit or snap fit connection to allow easy removal.

The blade carrier 26 may extend beyond the front edge 72 of the housing 20 by a distance d1 of about 0.2 mm to about 10 mm to provide sufficient view of the cutting edge 28 during shaving. If d1 is too short, the housing 20 may obstruct the view of the user thus interfering with accurate edging of hair (e.g., side burns and beard lines). If d1 is too long, excessive force may be applied the blade carrier assembly causing it to bend or loosen from the housing 20. In certain embodiments, the cutting edge 28 extends a distance of about 0 mm to about 10 mm beyond the front edge of the housing 20 and more preferably about 1 mm to about 5 mm to facilitate sufficient viewing angle of the cutting edge 28 during edging of hair.

The tab 44 may be positioned between a pair of guide members 84 and 86 of the housing 20 and along a centerline "CL" of the of the blade carrier 26. The crest 46 may be spaced apart from the bottom surface 56 of the housing 20 to facilitate proper flexing during the attachment of the shaving razor cartridge 18 to the handle 12. The guide members 84 and 86 may engage the corresponding guide surfaces 34 and 36 on the handle 12 (see FIG. 1B) as the shaving razor cartridge slides onto the handle 12. The guide members 84 and 86 may define an undercut surface 88 of the housing 20 (e.g., a "T" shaped slot) that engages a corresponding feature on the handle 12 to secure the shaving razor cartridge 18 to the handle 12.

The tab 44 may extend a distance "d2" of about 3 mm to about 15 mm from the notches 80 and 82 to the second end 74 (i.e., end of the tab 44) and more preferably about 5 mm to about 10 mm. The distance "d2" may also represent the length that is unsupported (i.e., not touching the bottom surface 56 of the housing 20) The guide members 84 and 86 may extend beyond the tab 44 (i.e., the second end 74) to allow the shaving razor cartridge 18 to easily engage the handle 12 before the tab 44 begins to deflect and exert a force against the handle 12, which may allow for easier loading.

In certain embodiments, the notches 80 and 82 may be incorporated to help define the performance of the tab 44 and also facilitate properly locating the blade carrier 26 during assembly. The abutment surfaces 90 and 92 may facilitate proper positioning of the blade carrier assembly 22 on the housing 20. The notches 80 and 82 may have a respective width "w1" and "w2" of about 1 mm to about 5 mm. The notches 80 and 82 may have a respective length "L1" and "L2" of about 1 mm to about 5 mm. The notches 80 and 82 form a radius with the tab 44 of about 0.1 mm to about 3 mm. The dimensions of the notches 80 and 82 may provide the tab 44 with sufficient flexibility so loading of the shaving razor cartridge 18 to the handle provides sufficient consumer feedback, but is not too difficult.

Figure 5:
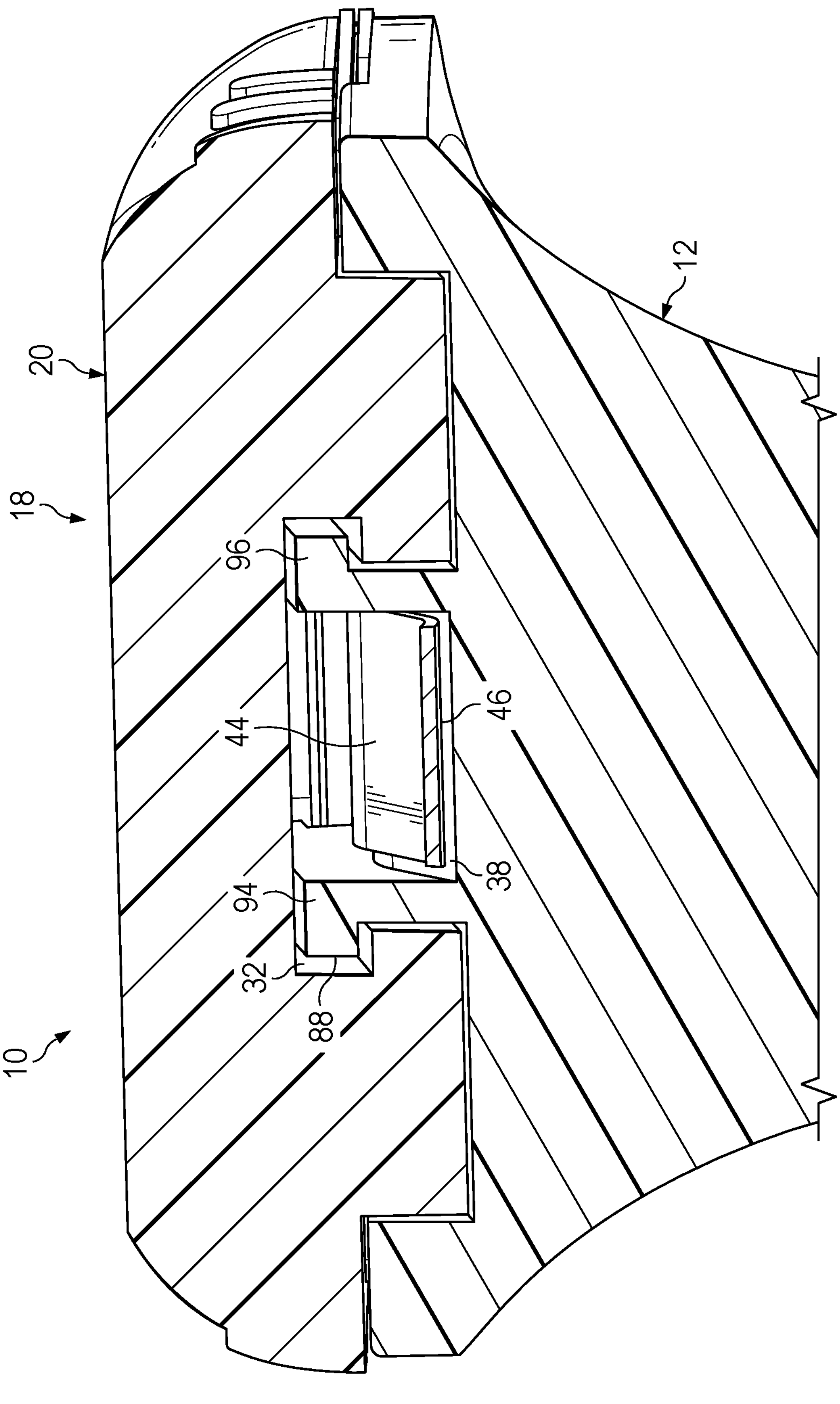
FIG. 5 is a cross sectional view of the shaving razor system, taken generally along the line 5-5 of FIG. 1A.

Referring to FIG. 5, a cross sectional view of the shaving razor system 10, taken generally along the line 5-5 of FIG. 1A is shown. The shaving razor cartridge 18 may be securely mounted (i.e., docked position) to the handle 12. In the docked position, the tab 44 may bottom out within the recessed surface 38. Accordingly, force must be applied to the shaving razor cartridge 18 to move the tab 44 (i.e., crest 46) out of the recessed surface 38. The top surface 32 of the handle 12 may include a pair of L shaped arms 94 and 96 dimensioned to engage the undercut surface 88 (e.g., "T" shaped slot) to retain the housing 20 on the handle 12. The recessed surface 38 (FIG. 1B) may be positioned between the pair of L shaped arms 94 and 96. When the shaving razor cartridge 18 is attached to the handle 12, the tab 44 may be positioned between the pair of arms 94 and 96.

Figure 6:
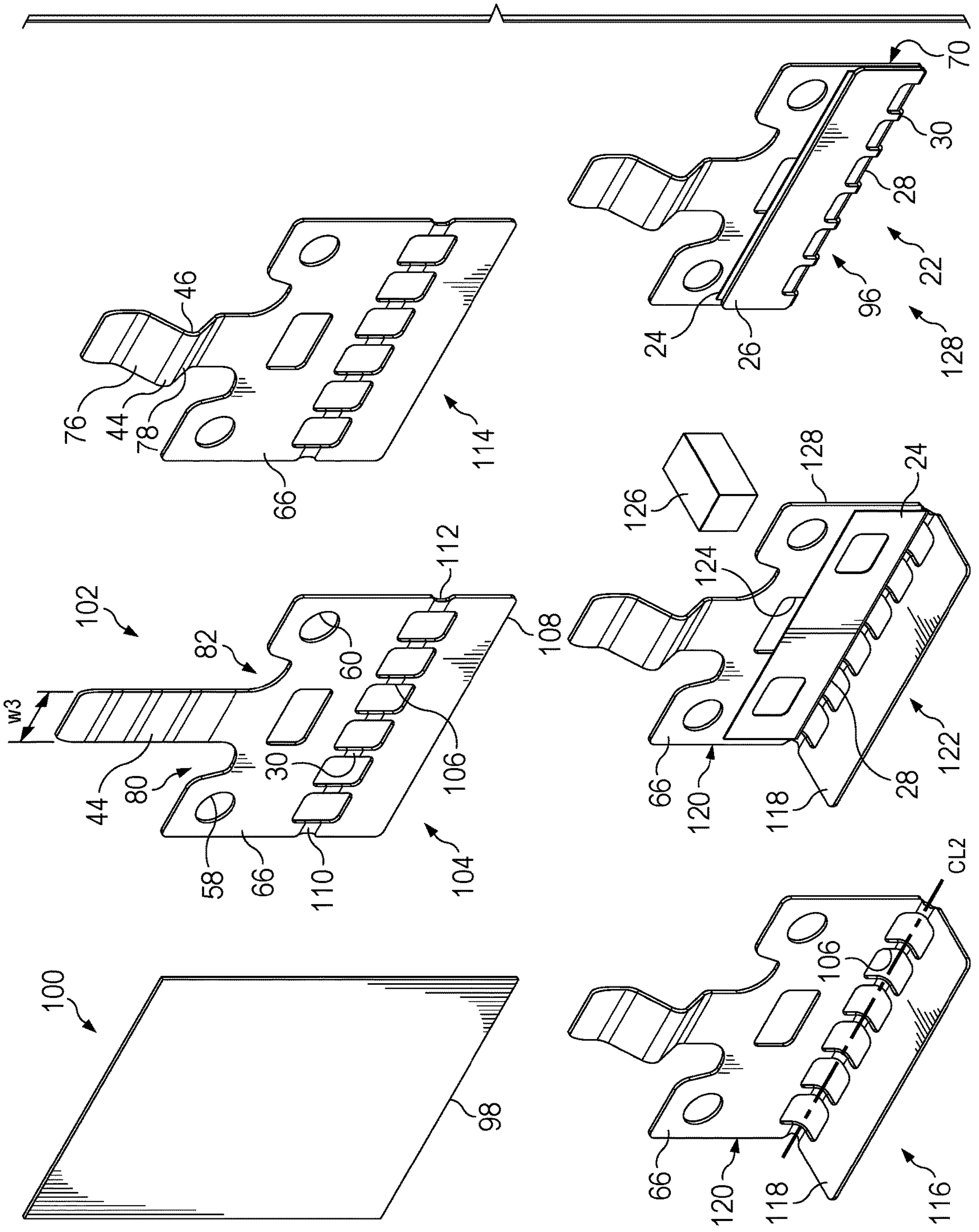
FIG. 6 is a schematic view of the assembly steps for the blade carrier assembly.

The blade carrier 22, such as the blade platform 66 and the tab 44, may be a monolithic unitary member, which may provide for a stronger and simpler construct. In certain embodiments, the blade carrier 22 may be injection molded from a polymeric material, such as polycarbonate, high impact polystyrene, ABS, Nylon, polyoxymethylene, or any combination thereof. In other embodiments, the blade carrier 22 may be manufactured from metal using various types of metal forming processes. Referring to FIG. 6, a schematic view of one possible assembly method for the blade carrier assembly 22 is illustrated. In a first step 98 of the assembly method, the blade carrier assembly 22 may begin with a single piece of sheet metal 100 having a thickness of about 0.1 mm to about 1.0 mm and more preferably about 0.15 mm to about 0.3 mm. The sheet metal 100 may comprise various grades of aluminum and steel.

The sheet metal 100 may be cut (e.g., laser cutting) or stamped to form a blade carrier blank 102 in a second step 104. It is understood that multiple blade carrier blanks 102 may be cut or stamped from a single piece of sheet metal. Accordingly, the sheet metal 100 can have numerous possible lengths and width. The blade carrier blank 102 may include the blade platform 66 and the tab 44 extending from the blade platform 66. The tab 44 may have a width "w3" of about 1 mm to about 10 mm. The tab 44 may have a thickness of about 0.1 mm to about 1.0 mm and more preferably about 0.15 mm to about 0.3 mm. Other features may also be cut or stamped into the blade carrier blank 102, such as the notches 80 and 82 on either side of the tab 44 and the alignment members 58 and 60. At least one window 106 may be stamped or cut into the piece of sheet metal 100 (e.g., the blade platform 66) between a first end 108 of the blade carrier blank 102 and the tab 44. In certain embodiments, there may be several windows 106 that are spaced apart to form row. Accordingly, the windows 96 may form the plurality of spaced apart guards 30 of the blade carrier 26. Although a plurality of windows 106 are shown it is understood that a single elongated window may alternatively be formed. In certain embodiments, a notch 110 and 112 may be formed (e.g., stamped or cut) into either ends of the window(s) 106 to facilitate bending of the blade carrier blank 102 (e.g., the blade platform 66)

A third step 114 and a fourth step 116 may include one or bending steps. For example, in the third step 114, the tab 44 may be coined or bent to form the crest 46 between the pair of angled surfaces 76 and 78. The blade platform 66 may be bent (e.g., swivel bending or coining) along the window(s) 106 (e.g., along a centerline "CL2" of the window(s) 106 in the a fourth step 116 to form an upper portion 118 and a lower portion 120. The platform 66 may be bent to form an angle from greater than 0 to over 90 degrees. The blade 24 may be mounted to the platform 66 between the upper portion 118 and the lower portion 120 in a fifth step 122. In certain embodiments, an alignment opening 124 may be provided (e.g., in the second step 104) that extends through the blade platform 66. The alignment opening 124 may allow a projection 126 to be inserted into the blade platform 66 to facilitate alignment of the blade 24 against an inner surface 128 of the blade carrier 26.

In a sixth step 130, the upper portion 118 and the lower portion 120 may be clamped together by bending the upper portion 118 and the lower portion 120 towards each other. The bending of the platform to form an angle greater than 90 degrees between the upper portion 118 and the lower portion 120 in the fifth step 122 may facilitate easier and more accurate placement and alignment of the blade 24, as well as facilitating the bending of the upper portion 118 and lower portion 120 towards each other to clamp and secure the blade 24 safely in place. When the blade 24 is secured between the upper portion 118 and the lower portion 120, the plurality of spaced apart windows 106 may form the spaced apart guards 30 of the blade carrier. The upper portion 118 and the lower portion 120 may be then bent towards each other such that the blade 24 contacts both the upper portion 118 and the lower portion 120, as shown in step 128. The upper portion 118 and/or the lower portion 120 may be bent towards each other such that the slot 70 is formed for holding the blade 24. In certain embodiments, the slot 70 may be formed first, then the blade 24 may be inserted into the slot 70. The blade 24 may then be further secured by further clamping the lower portion 120 and/or the upper portion 118 or the blade 24 may be secured by welding or adhesives. Accordingly, the blade 24 is secured (e.g., clamped) on the blade platform 66 between the upper portion 118 and the lower portion 120 with the cutting edge 28 positioned against the window(s) 106 to form the blade carrier assembly 22. In any of the embodiments described, the blade 24 may be secured to the blade platform 66 by welding or adhesives. It is understood that several of the steps may be done together. For example, the second step 104 and the third step 114 may be performed simultaneously.

Figure 7:
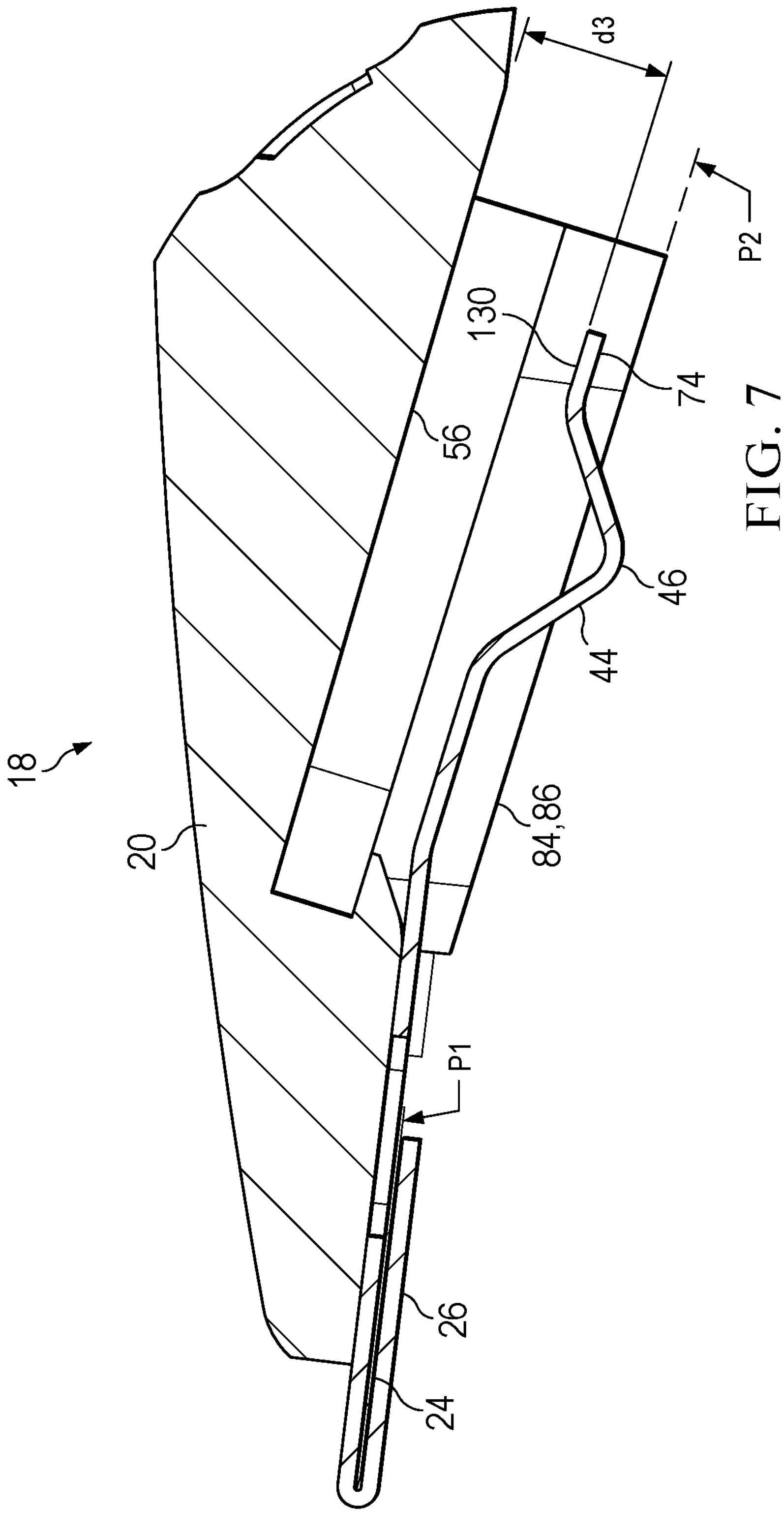
FIG. 7 is a cross sectional view of the cartridge assembly, taken generally along the line 7-7 of FIG. 4.

Referring to FIG. 7, a cross sectional view of the shaving razor cartridge 18 of FIG. 2 is shown with the handle 12 removed for clarity. The crest 46 may be positioned below a plane P1 of the blade 24. The crest 46 may be positioned below a plane P2 of the guide members 84, 86 (e.g., away from the bottom surface 56) when the tab 44 is in a neutral position (e.g., not under load). The tab 44 may flex in the first or second position such that the tab 44 is positioned above the plane P2 of the guide members 84, 86 (i.e., closer to the bottom surface 56). As the shaving razor cartridge 18 is attached to the handle 12 (FIG. 1A), the tab 44 may flex toward the housing 20 then return towards its normal unflexed condition once the crest 46 is seated within the lowermost portion 50 of the recess 38 (FIG. 2). In certain embodiments, the tab 44 may not return completely to its normal resting position. For example, the tab 44 may remain in tension when the shaving razor cartridge 18 is attached to the handle 12, which may provide for more positive engagement between the two components. The second end 74 may be spaced apart from the bottom surface 56 of the housing a vertical distance d3 greater than 0 mm to about 5 mm in the first position, to facilitate the movement (e.g., flexing) of the tab 44 relative to the housing 20, thus allowing removal of the shaving razor cartridge 18. The tab 44 may flex between the first position and a second position during attachment and removal of the shaving razor cartridge 18. The distance d3 may be greater in the first position when the shaving razor cartridge 18 is secured to the handle 12 (FIG. 2) than a second position when the crest 46 disengages from the recessed surface 38 (FIG. 2) of the handle 12 (FIG. 2) during removal of the shaving razor cartridge 18. In certain embodiments, the bottom surface 56 may act as a stop surface to prevent over stressing the tab 44. For example, in the second position, the bottom surface 56 of the housing 20 may contact a bottom surface 130 of the second end 74 during the attachment and detachment of the shaving razor cartridge 18 to the handle 12 (FIG. 1A).

The incorporation of the tab 44 into the blade carrier 26 that holds and provides guarding elements (i.e., spaced apart guards 30) greatly simplifies the design by reducing the number of components because the blade carrier 26 performs multiple functions by aiding in attachment to the handle 12 (FIG. 1A), retaining the blade 24 and protecting a safe shave with the spaced apart guards 30. Furthermore, tolerance stacking of the components is also reduced, thus lowering the level of precision needed during the assembly process. The tab 44 may also help ensure integrity of the shaving razor cartridge 18 by absorbing force if the shaving razor cartridge 18 or the shaving razor system 10 is dropped, which is often problematic for more premium handles which are much heavier. Furthermore, the forming of the blade carrier 22 from a single piece of metal also provides a much more robust design which is cable of lasting longer.

The dimensions and values disclosed herein are not to be understood as being strictly limited to the exact numerical values recited. Furthermore, dimensions should not be held to an impossibly high standard of metaphysical identity that does not allow for discrepancies due to typical manufacturing tolerances. Therefore, the term "about" should be interpreted as being within typical manufacturing tolerances.

Every document cited herein, including any cross referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A shaving razor system comprising:

a handle having a first end with a top surface when in an upright position defining a recess between a pair of slots;

a shaving razor cartridge removably mounted to the first end of the handle, the shaving razor cartridge comprising a housing and a blade carrier assembly, the blade carrier assembly having a a blade platform at a first end, the blade carrier assembly having a tab extending from the blade platform to define a second end of the blade carrier assembly, the tab having a crest configured to being moved between a first engaged position and a second disengaged position, the crest being engaged with the recess of the handle in the first position; and a blade mounted to the blade platform, the blade having a cutting edge; wherein the tab is positioned between a pair of guide members on the housing, and each of the pair of guide members respectively engage one of the slots of of the handle.

2. The shaving razor system of claim 1 wherein when in the second position the crest is disengaged from the recess.

3. The shaving razor system of claim 1 wherein each of the pair of guide members on the housing define an undercut surface.

4. The shaving razor system of claim 1 wherein the pair of guide members define a "T" shaped slot in the housing.

5. The shaving razor system of claim 1 wherein the second end is spaced apart from a bottom surface when in the upright position of the housing a vertical distance greater than 0 mm to 5 mm.

* * * * *